(12) United States Patent
Nambara (10) Patent No.: US 12,124,031 B2
(45) Date of Patent: Oct. 22, 2024

(54) VIRTUAL IMAGE DISPLAY DEVICE

(71) Applicant: DENSO CORPORATION, Kariya (JP)

(72) Inventor: Takahiro Nambara, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 601 days.

(21) Appl. No.: 17/493,225

(22) Filed: Oct. 4, 2021

(65) Prior Publication Data

US 2022/0026712 A1    Jan. 27, 2022

Related U.S. Application Data (63) Continuation of application No. PCT/JP2020/007459, filed on Feb. 25, 2020.

(30) Foreign Application Priority Data

May 7, 2019    (JP) .................................. 2019-087861

(51) Int. Cl.
    *G02B 27/01*    (2006.01)
    *G02B 5/04*     (2006.01)

(52) U.S. Cl.
    CPC .......... *G02B 27/0101* (2013.01); *G02B 5/045* (2013.01)

(58) Field of Classification Search
    CPC ..... G02B 2027/0105–0198; G02B 27/00–648; G02B 5/00–32
    See application file for complete search history.

(56) References Cited

U.S. PATENT DOCUMENTS

| | | | |
|---|---|---|---|
| 2004/0246392 A1 | 12/2004 | Maruyama et al. | |
| 2013/0016136 A1* | 1/2013 | Yasui | ..................... G03B 33/08 362/231 |
| 2014/0268358 A1 | 9/2014 | Kusaka et al. | |
| 2016/0116735 A1 | 4/2016 | Hayashi et al. | |
| 2017/0045740 A1 | 2/2017 | Hirata et al. | |

(Continued)

FOREIGN PATENT DOCUMENTS

| | | |
|---|---|---|
| JP | 2003137004 A | 5/2003 |
| JP | 2014174494 A | 9/2014 |

(Continued)

*Primary Examiner* — Bao-Luan Q Le
*Assistant Examiner* — Christopher A Lamb, II
(74) *Attorney, Agent, or Firm* — Harness, Dickey & Pierce, P.L.C.

(57) ABSTRACT

A virtual image display device includes a backlight and an image display panel that displays an image to be imaged as a virtual image on a display screen. The backlight has a deflection prism array on an optical path between a light source unit and the image display panel. The deflection prism array includes deflection prism elements to deflect the illumination light, and deflects a direction of an after-transmission vector corresponding to a Poynting vector of the illumination light immediately after passing through the deflection prism array with respect to a direction of a before-transmission vector corresponding to a Poynting vector of the illumination light immediately before passing through the deflection prism array. An angle between a unit normal vector of the display screen and the after-transmission vector is larger than an angle between the unit normal vector of the display screen and the before-transmission vector.

11 Claims, 8 Drawing Sheets

(56) References Cited

U.S. PATENT DOCUMENTS

2019/0179143 A1    6/2019  Nambara
2020/0174253 A1    6/2020  Nambara
2020/0218070 A1*  7/2020  Koike ................ G02B 27/0081

FOREIGN PATENT DOCUMENTS

| JP | 2016133700 A | 7/2016 |
| JP | 2016136222 A | 7/2016 |
| JP | 2017207622 A | 11/2017 |
| JP | 2019049581 A | 3/2019 |
| WO | WO-2015170406 A1 | 11/2015 |

* cited by examiner

VIRTUAL IMAGE DISPLAY DEVICE

CROSS REFERENCE TO RELATED APPLICATION

The present application is a continuation application of International Patent Application No. PCT/JP2020/007459 filed on Feb. 25, 2020, which designated the U.S. and claims the benefit of priority from Japanese Patent Application No. 2019-087861 filed on May 7, 2019. The entire disclosures of all of the above applications are incorporated herein by reference.

TECHNICAL FIELD

The present disclosure relates to a virtual image display device.

BACKGROUND

A virtual image display device is mounted on a vehicle and displays a virtual image. The virtual image display device includes a backlight and an image display panel. The image display panel transmits an illumination light from the backlight and displays an image to be imaged as a virtual image on a display screen.

SUMMARY

A virtual image display device for a vehicle displays a virtual image, and includes: a backlight that provides illumination light; and an image display panel that transmits the illumination light and displays an image to be imaged as the virtual image on a display screen. The backlight has: a light source unit that emits the illumination light toward the image display panel; and a deflection prism array arranged on an optical path between the light source unit and the image display panel. The deflection prism array includes deflection prism elements arranged to deflect the illumination light from the light source unit while transmitting the illumination light. The deflection prism array deflects a direction of an after-transmission vector corresponding to a Poynting vector of the illumination light immediately after transmitting the deflection prism array with respect to a direction of a before-transmission vector corresponding to a Poynting vector of the illumination light immediately before transmitting the deflection prism array. An angle formed by a unit normal vector of the display screen and the after-transmission vector is larger than an angle formed by the unit normal vector of the display screen and the before-transmission vector.

DESCRIPTION OF EMBODIMENT

To begin with, examples of relevant techniques will be described.

A virtual image display device is mounted on a vehicle and displays a virtual image. The virtual image display device includes a backlight and an image display panel. The image display panel transmits an illumination light from the backlight and displays an image to be imaged as a virtual image on a display screen. A plate-shaped projection lens provided on the backlight and the image display panel are arranged in an inclined manner.

In the virtual image display device, external light such as sunlight is incident on the display screen in the opposite direction to the light of the image. The external light is reflected in the reflection direction different from that of the light of the image. Since the external light is separated from the optical path of the light of the image, the external light is restricted from being seen in the virtual image.

In recent, the image display panel tends to be enlarged in order to display a larger virtual image. As the size of the image display panel increases, the angle between the reflection direction of the external light and the traveling direction of the light of the image is to be increased to prevent phenomenon that the external light overlaps a part of the virtual image. However, if the image display panel is tilted too much in order to increase the angle, the illumination light may not be able to efficiently pass through the image display panel and an extremely large dead space is generated in the backlight.

There are concerns when the virtual image display device is applied to a vehicle in an environment where an external light such as sunlight is present, and for ensuring mountability on a vehicle.

The present disclosure provides a virtual image display device suitable for being used in a vehicle.

According to an aspect of the present disclosure, a virtual image display device configured to display a virtual image includes: a backlight that provides illumination light; and an image display panel that transmits the illumination light and displays an image to be imaged as the virtual image on a display screen. The backlight has: a light source unit that emits the illumination light toward the image display panel; and a deflection prism array arranged on an optical path between the light source unit and the image display panel. The deflection prism array includes deflection prism elements arranged to deflect the illumination light from the light source unit while transmitting the illumination light. The deflection prism array deflects a direction of an after-transmission vector corresponding to a Poynting vector of the illumination light immediately after transmitting the deflection prism array with respect to a direction of a before-transmission vector corresponding to a Poynting vector of the illumination light immediately before transmitting the deflection prism array. An angle formed by a unit normal vector of the display screen and the after-transmission vector is larger than an angle formed by the unit normal vector of the display screen and the before-transmission vector.

Accordingly, since the angle between the unit normal vector and the after-transmission vector is larger than the angle between the unit normal vector and the before-transmission vector, an angle between the reflection direction of the external light incident on the display screen and the traveling direction of the light of the image emitted from the display screen becomes large. Therefore, it is possible to suppress the phenomenon that the external light overlaps a part of the virtual image.

This phenomenon is suppressed by arranging a deflection prism array on the optical path between the light source unit and the image display panel. Since the deflection prism array deflects the illumination light from the light source while transmitting the illumination light, the angle between the unit normal vector and the after-transmission vector can be increased without tilting the image display panel too much. Therefore, it is possible to suppress deterioration in the transmission efficiency of the illumination light in the image display panel and suppress the occurrence of an extremely large dead space in the backlight.

Further, since the deflection prism array is formed by arranging the deflection prism elements, the physique of the backlight is less affected. From the above, it is possible to provide a virtual image display device suitable for vehicle use.

Hereinafter, multiple embodiments will be described with reference to the drawings. It should be noted that the same reference numerals are assigned to the corresponding components respectively in the respective embodiments, so that duplicative descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined even if they are not explicitly shown if there is no problem in the combinations.

FIRST EMBODIMENT

Figure 1:
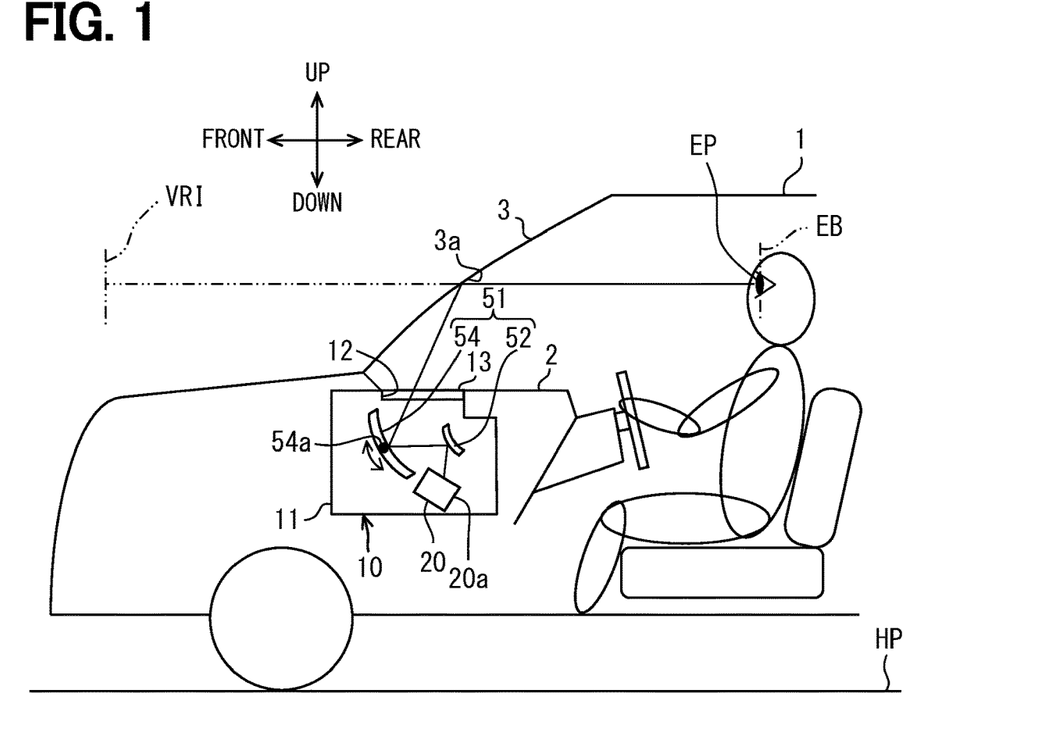
FIG. 1 is a diagram illustrating a head-up display device according to a first embodiment.

As shown in FIG. 1, a virtual image display device according to a first embodiment is configured to be mounted on a vehicle 1, and is a head-up display (HUD) 10 housed in an instrument panel 2 of the vehicle 1. The "vehicle" is broadly construed to include various objects such as an aircraft, a ship, and a game console body, which does not move, in addition to an automotive and a railway vehicle.

The HUD 10 projects a light of image toward a projection unit 3a provided on a windshield 3 of the vehicle 1. The HUD 10 displays the image as a virtual image VRI that can be visually recognized by the occupant as a viewer. That is, when the light of image reflected by the projection unit 3a reaches the viewing area EB set in the vehicle, the occupant whose eye point EP is located in the viewing area EB perceives the light of image. The occupant can recognize various information by the display content superimposed on the scenery outside the vehicle.

Examples of the display contents include information indicating the state of the vehicle 1 such as vehicle speed and remaining fuel amount, and navigation information such as visibility assistance information and road information.

In the following, unless otherwise specified, each of front, rear, up, down, left and right directions is described with reference to the vehicle 1 on the horizontal plane HP.

The windshield 3 is a transmissive member made of, for example, glass or synthetic resin, and is formed in a translucent plate. The windshield 3 is arranged above the instrument panel 2. The windshield 3 is inclined so as to separate from the instrument panel 2 as extended from the front to the rear. The windshield 3 forms the projection unit 3a on which the light of image is projected in a smooth concave surface or a flat surface. The projection unit 3a is configured to surface-reflect the light of image.

The projection unit 3a may be formed by providing a reflective holographic optical element on the windshield 3. In this case, the projection unit 3a reflects the light of image toward the viewing area EB by diffraction reflection due to interference fringes instead of surface reflection. Further, the projection unit 3a may not be provided on the windshield 3. For example, a combiner that is separate from the vehicle 1 may be installed in the vehicle 1, and the combiner may be provided with the projection unit 3a.

The viewing area EB is also referred to as an eye box, where the virtual image VRI displayed by the HUD 10 is visually recognizable so as to satisfy a predetermined standard (for example, the entirety of the virtual image VRI has a predetermined or higher luminance). The viewing area EB is typically set to overlap the eyelips set in the vehicle 1. The eyelips is set for each of the eyes as an ellipsoidal virtual space based on the eye range that statistically represents the spatial distribution of the eye point EP of the occupant.

A specific configuration of the HUD 10 will be described below. The HUD 10 includes a housing 11, a display 20, and a light guide unit 51.

The housing 11 is made of, for example, synthetic resin or metal and has a hollow shape housing the display 20, the light guide unit 51, and the like. The housing 11 is installed in the instrument panel 2. The housing 11 has a window portion 12 that optically opens on an upper surface portion that faces the projection unit 3a in the up-down direction. The window portion 12 is covered with, for example, a dustproof sheet 13 capable of transmitting the light of image.

Figure 2:
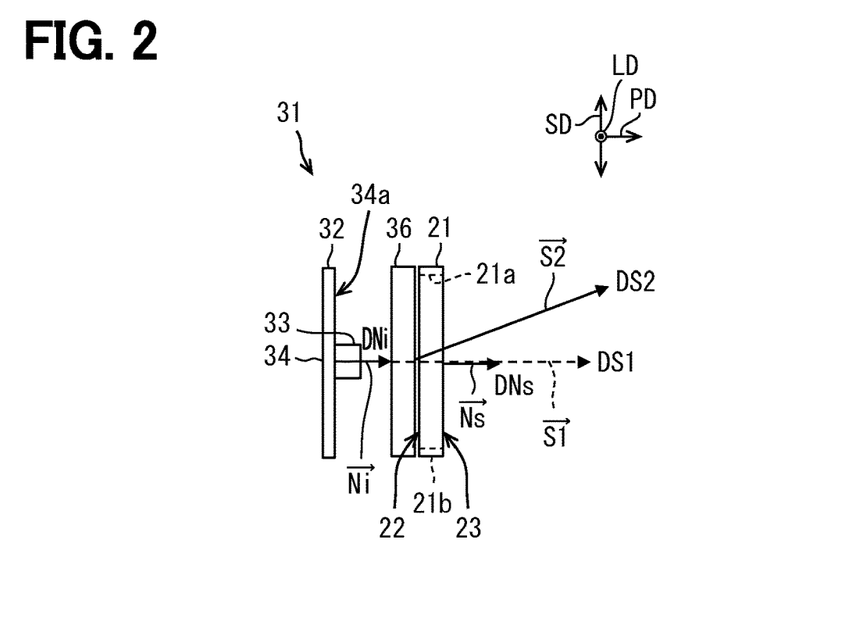
FIG. 2 is a diagram illustrating an internal configuration of a display device of the first embodiment.

The display 20 displays an image on the display screen 23, and emits the light of the image toward the light guide unit 51. The display 20 of the present embodiment is a transmissive liquid crystal display. As shown in FIG. 2, the display 20 includes an image display panel 21 and a backlight 31. The display 20 has, for example, a light-shielding box-shaped casing 20a housing the image display panel 21 and the backlight 31, and the display screen 23 of the image display panel 21 is exposed to the outside of the casing 20a.

The image display panel 21 of the present embodiment is a thin film transistor (TFT) liquid crystal panel such as an active matrix type liquid crystal panel in which plural liquid crystal pixels are arranged in a two-dimensional arrangement.

The image display panel 21 has an optical opening 21a that optically opens to be able to transmit illumination light. A light-shielding frame portion 21b entirely surrounds the optical opening 21a. The optical opening 21a has a rectangular shape extended in a longitudinal direction LD and a lateral direction SD, as the liquid crystal pixels are arranged as described above. That is, the optical opening 21a has a rectangular shape in the cross-section. In the optical opening 21a, a surface exposed to a side opposite to the backlight 31 is the display screen 23 that displays an image. The surface, in the optical opening 21a, facing the backlight 31 is an illumination target surface 22 illuminated by the backlight 31. The illumination target surface 22 is arranged substantially parallel to the display screen 23. The display screen 23 and the illumination target surface 22 have a rectangular shape extended in the longitudinal direction LD and the lateral direction SD, that is, a rectangular contour.

The entire surface of the optical opening 21a is closed by stacking a pair of polarizing plates and a liquid crystal layer interposed between the polarizing plates. Each of the polarizing plates has a transmission axis and an absorption axis orthogonal to each other. A light polarized in the transmission axis direction passes through the polarizing plate, and a light polarized in the absorption axis direction is absorbed by the polarizing plate. The pair of polarizing plates are arranged so that their transmission axes are orthogonal to each other. The liquid crystal layer is able to rotate the polarization direction of light incident on the liquid crystal layer in accordance with a voltage applied to each liquid crystal pixel. In this way, the image display panel 21 can change the ratio of light transmitted through the polarizing plate adjacent to the display screen 23, that is, the transmittance, for each liquid crystal pixel by rotating the polarization direction.

Therefore, in the image display panel 21, the transmittance of each liquid crystal pixel is controlled in response to the incident of the illumination light from the backlight 31, so that the illumination light is used to display the image on the display screen 23. Color filters having different colors (for example, red, green, and blue) are provided on the adjacent liquid crystal pixels, and various colors can be reproduced by the combination.

In each liquid crystal pixel, a transmission portion that optically opens and a wiring portion formed to surround the transmission portion are arranged so as to penetrate between the display screen 23 and the illumination target surface 22 along a direction DNs of a unit normal vector Ns of the display screen 23. Therefore, the optical opening 21a surrounded by the light-shielding frame portion 21b constitutes a large opening, whereas the transmission portion for each pixel constitutes a small opening.

The backlight 31 provides the illumination light to the image display panel 21 by irradiating the illumination target surface 22. Specifically, the backlight 31 of the present embodiment includes a light source unit 32 and a deflection prism array 36.

The light source unit 32 of the present embodiment has light source elements 33 arranged on a light source arrangement surface 34a of the light source circuit board 34. The light source elements 33 are arranged along the longitudinal direction LD. The light source circuit board 34 is a rigid substrate having a rectangular outline and a flat plate shape, and is made of a synthetic resin such as a glass epoxy resin as a base material. The light source circuit board 34 is arranged so that the light source arrangement surface 34a is substantially parallel to the display screen 23 and the illumination target surface 22 of the image display panel 21. Since a wiring pattern is formed on the light source arrangement surface 34a, each light source element 33 is connected to the power supply through the wiring pattern. The light source element 33 is made of, for example, a light emitting diode element as a point light source. The light source element 33 is formed by sealing a chip-shaped blue light emitting diode with a yellow phosphor in which a yellow fluorescent agent is mixed with a synthetic resin having translucency. The yellow phosphor is excited by the blue light emitted from the blue light emitting diode according to the amount of current, such that the yellow light is emitted. As a result of the mixture of the blue light and the yellow light, white (more specifically, pseudo-white) illumination light is emitted from the light source element 33 toward the image display panel 21.

The light source element 33 emits illumination light with a radiation angle distribution in which the emission intensity relatively decreases as deviating from the intensity peak direction PD where the emission intensity is the maximum. The radiation angle distribution has rotational symmetry with the intensity peak direction PD as the axis of symmetry. In the present embodiment, the intensity peak directions PD of the light source elements 33 are set so as to substantially coincide with each other, and substantially coincide with a direction DNi of a unit normal vector Ni of the light source arrangement surface 34a.

Figure 3:
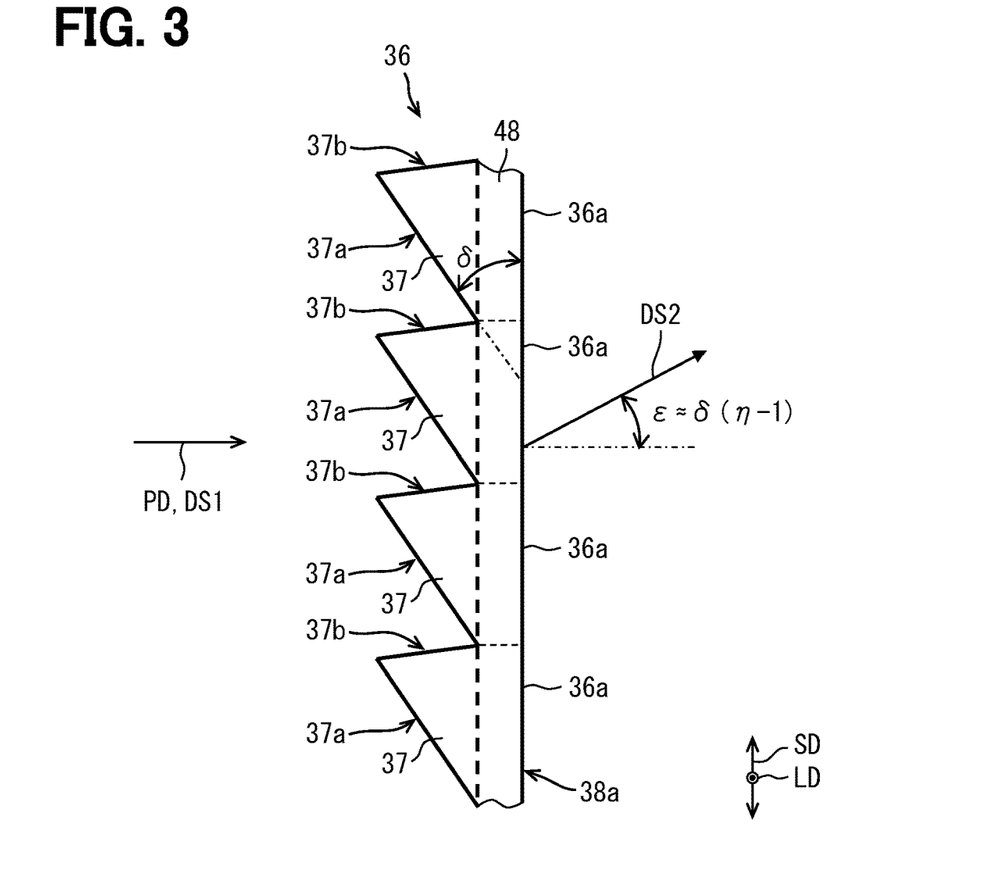
FIG. 3 is a cross-sectional view illustrating a deflection prism array of the first embodiment.

The deflection prism array 36 is arranged on the optical path between the light source unit 32 and the image display panel 21. The deflection prism array 36 is formed to be translucent by using an optical material such as synthetic resin or glass. The deflection prism array 36 is formed in a plate shape in which deflection prism elements 36a are arranged, so that the illumination light from the light source unit 32 is transmitted and deflected in a predetermined direction to be incident on the image display panel 21. As shown in FIG. 3, each deflection prism element 36a extends along the longitudinal direction LD and arranged along the lateral direction SD. The arrangement pitch of the deflection prism element 36a is set to be approximately the same as the arrangement pitch of the liquid crystal pixels (for example, 80 μm).

Each deflection prism element 36a has a so-called triangular prism shape. Each deflection prism element 36a is formed so that the incident side optical surface 37a and the emission side optical surface 38a form a predetermined angle (hereinafter, prism angle δ).

In the present embodiment, the deflection prism array 36 has a flat plate-shaped substrate portion 38 common among the deflection prism elements 36a and a triangular-columnar prism portion 37 joined to the substrate portion 38 corresponding to each deflection prism element 36a. Since the substrate portion 38 is provided, the emission side optical surface 38a is formed in a flat shape common among the deflection prism elements 36a. The emission side optical surface 38a is arranged so as to be substantially parallel to the light source arrangement surface 34a, the display screen 23, and the illumination target surface 22. The emission side optical surface 38a is arranged adjacent to the illumination target surface 22 through an air layer formed by a slight gap between the emission side optical surface 38a and the illumination target surface 22.

The incident side optical surface 37a is inclined by a prism angle δ with respect to the light source arrangement surface 34a, the display screen 23, the illumination target surface 22 and the emission side optical surface 38a. The same number of the incident side optical surfaces 37a are provided as the deflection prism elements 36a so as to correspond to the deflection prism elements 36a respectively. The incident side optical surfaces 37a is formed in an elongated flat shape extending along the longitudinal direction LD. The incident side optical surfaces 37a are oriented to face a common direction.

A step is formed between the incident side optical surfaces 37a of the deflection prism elements 36a adjacent to each other. In order to connect the steps, a step connecting surface 37b is formed between the incident side optical surfaces 37a. The step connecting surface 37b is along the intensity peak direction PD in order to suppress the incident of illumination light from the light source unit 32. In other words, it is preferable that the prism portion 37 has a right-angled triangular shape in the cross section including the lateral direction SD. However, in the present embodiment, since the deflection prism array 36 is manufactured by a die molding method, the step connecting surface 37b has a slight inclination angle, with respect to the emission side optical surface 38a, corresponding to the die removable angle after the molding.

Thus, each deflection prism element 36a is shaped to have an asymmetry in the lateral direction SD, such that the incident side optical surface 37a and the emission side optical surface 38a are separated from each other as moving toward the separation side in the lateral direction SD.

When the illumination light along the intensity peak direction PD is incident on the deflection prism array 36, the illumination light is refracted by the incident side optical surface 37a and the emission side optical surface 38b. Due to these refractions, the illumination light emitted from the deflection prism array 36 is deflected in the separation direction. The deflection prism elements 36a exert a uniform deflection action on the illumination light, due to the common shape except that the deflection prism elements 36a are arranged at positions shifted from each other in the lateral direction SD.

Now, the progress of the illumination light is regarded as the flow of light energy. The deflection prism array 36 deflects the flow direction of optical energy. In the following, the flow of light energy will be described using a Poynting Vector.

Figure 4:
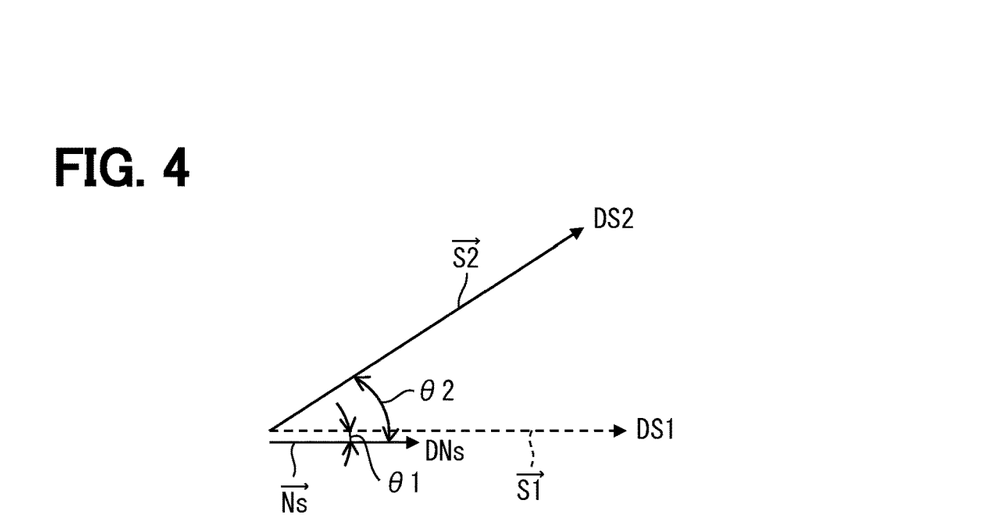
FIG. 4 is a diagram for explaining vectors and angles in the first embodiment.

As shown in FIGS. 2 and 4, for the illumination light transmitted through the deflection prism array 36, a before-transmission vector S1 corresponding to a Poynting vector of the illumination light immediately before the transmission is defined. The before-transmission vector S1 is calculated by the illumination light incident on the incident region surface of the deflection prism array 36 (in the present embodiment, each incident side optical surface 37a and each step connecting surface 37b) in a unit time. The Poynting vector can be defined for each position of the incident region surface. In detail, the before-transmission vector S1 is obtained relative to the entire incident region surface by taking the vector sum of the Poynting vectors defined at the center position for each unit area. The before-transmission vector S1 represents the flow of energy of the illumination light incident on the entire deflection prism array 36.

Similarly, for the illumination light transmitted through the deflection prism array 36, an after-transmission vector S2 corresponding to the Poynting vector of the illumination light immediately after the transmission is defined. The after-transmission vector S2 is calculated by the illumination light emitted from the emission region surface (emission side optical surface 38a in this embodiment) of the deflection prism array 36 in a unit time. In detail, while the Poynting vector can be defined for each position of the emission region surface, the after-transmission vector S2 is obtained relative to the entire emission region surface by taking the vector sum of the Poynting vectors defined at the center position for each unit area. The after-transmission vector S2 represents the flow of energy of the illumination light emitted from the entire deflection prism array 36.

The calculation of the before-transmission vector S1 and the after-transmission vector S2 is analytically performed by, for example, an optical simulation by non-sequential ray tracing that reproduces the optical system of the backlight 31.

In order to understand the deflection action, a little qualitative explanation will be added to the before-transmission vector S1 and the after-transmission vector S2 of the present embodiment. The intensity peak direction PD is along the direction DNi of the unit normal vector Ni of the light source arrangement surface 34a, and the radiation angle distribution has rotational symmetry with the intensity peak direction PD as the axis of symmetry. Therefore, the angle formed by the before-transmission vector S1 and the unit normal vector Ni of the light source arrangement surface 34a is substantially 0 degree. In the present embodiment, since the light source arrangement surface 34a and the display screen 23 are substantially parallel to each other, the angle $\theta 1$ formed by the before-transmission vector S1 and the unit normal vector Ns of the display screen 23 is substantially 0 degree.

The deflection prism array 36 deflects the direction DS2 of the after-transmission vector S2 with respect to the direction DS1 of the before-transmission vector S1. The angle formed by the before-transmission vector S1 and the after-transmission vector S2 is defined as a deflection angle $\varepsilon$. This deflection angle $\varepsilon$ is represented by $\varepsilon \approx \delta(\eta-1)$ using an approximate expression obtained from Snell's law (see also FIG. 3). Here, $\eta$ is the refractive index of the optical material of the deflection prism array 36. For example, the refractive index of the gravity center wavelength of the illumination light is adopted as the refractive index $\eta$. The gravity center wavelength is a load average value of a wavelength obtained by weighting each wavelength included in the illumination light with the emission intensity of the wavelength.

The angle $\theta 2$ formed by the after-transmission vector S2 and the unit normal vector Ns of the display screen 23 is substantially equal to the deflection angle $\varepsilon \approx \delta(\eta-1)$. Therefore, in the deflection prism array 36, the angle $\theta 2$ formed by the after-transmission vector S2 and the unit normal vector Ns of the display screen 23 is larger than the angle $\theta 1$ formed by the before-transmission vector S1 and the unit normal vector Ns of the display screen 23.

Figure 5:
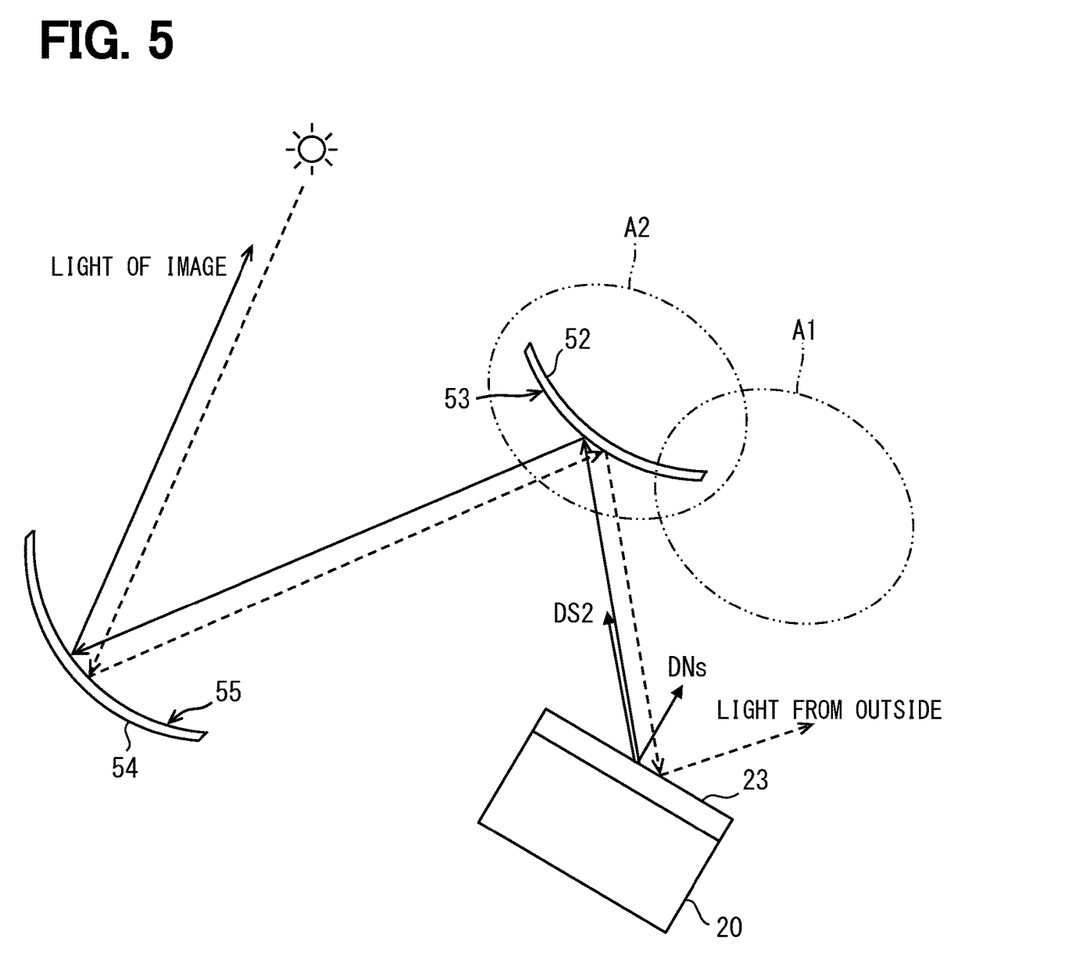
FIG. 5 is a diagram for schematically explaining a positional relationship between the display device and a light guide unit of the first embodiment, and how a light of image and an external light travel.

In this way, as shown in FIG. 5, the light of the image is emitted from the display 20 with the main direction DS2 different from the direction DNs of the unit normal vector Ns of the display screen 23.

The light guide unit 51 forms an optical path that guides the light of the image emitted from the display 20. The light guide unit 51 has reflective elements (for example, a convex mirror 52 and a concave mirror 54).

The convex mirror 52 is a reflective element positioned the closest to the display 20 among the reflective elements. The convex mirror 52 is positioned offset from a region A1 to which the display screen 23 is projected along the direction DNs. More specifically, the convex mirror 52 is arranged in a region A2 where the display screen 23 is projected along the direction DS2.

The convex mirror 52 forms a reflective surface 53, for example, by depositing aluminum on the surface of a base material made of synthetic resin or glass. The reflective surface 53 of the convex mirror 52 is formed into a smooth convex shape by being curved in a convex shape. The light of image incident on the convex mirror 52 from the display 20 is reflected toward the concave mirror 54 by the reflective surface 53.

The concave mirror 54 forms a reflective surface 55, for example, by depositing aluminum on the surface of a base material made of synthetic resin or glass. The reflective surface 55 of the concave mirror 54 is formed into a smooth concave surface by being curved in a concave shape. The light of image incident on the concave mirror 54 from the convex mirror 52 is reflected toward the projection unit 3a by the reflective surface 55.

The optical power of the light guide unit 51, that is, the combined power of the convex mirror 52 and the concave mirror 54 is set to be positive. Due to the positive optical power, the light guide unit 51 magnifies the virtual image VRI with respect to the real image on the display screen 23.

The display light reflected by the concave mirror 54 in this way is emitted to the outside of the HUD 10 by passing through the dustproof sheet 13, and is incident on the projection unit 3a of the windshield 3. When the display light reflected by the projection unit 3a reaches the occupant's eye point EP, the virtual image VRI can be visually recognized by the occupant, outside the vehicle opposite to the viewing area EB through the projection unit 3a. Here, since the projection unit 3a is provided on the windshield 3 as a transmission member, the virtual image VRI is displayed as superimposed on the scenery outside the vehicle. The longitudinal direction LD of the display 20 corresponds to the left-right direction in the virtual image VRI, and the lateral direction SD corresponds to the up-down direction in the virtual image VRI. Therefore, the virtual image VRI can be displayed longer in the horizontal direction than in the vertical direction.

Further, the concave mirror 54 can rotate around a rotation shaft 54a extending in the left-right direction according to the drive of the stepping motor. The display position of the virtual image VRI can be adjusted and displaced in the vertical direction by rotating the concave mirror 54.

External light that travels in the direction opposite to the light of image may be incident into the housing 11 of the HUD 10 through the window portion 12. The external light may be sunlight transmitted through the windshield 3. The external light is reflected by the concave mirror 54 and the convex mirror 52 of the light guide unit 51 in this order, and can reach the display screen 23. Further, the external light may be reflected on the display screen 23. The incident direction of external light incident on the display screen 23 is along a direction from the convex mirror 52 arranged in the region A2 toward the display screen 23, while the direction DNs of the unit normal vector Ns of the display screen 23 is different from the incident direction. Therefore, the reflection direction of the external light reflected on the display screen 23 is not along a direction returning to the convex mirror 52. Thus, the external light is separated from the optical path for the light of image.

In the first embodiment, the expressions such arrow and bold in each vector are omitted.

Operations and effects in the first embodiment will be described below.

According to the first embodiment, the angle θ2 is larger than the angle θ1, such that the angle defined between the reflection direction of the external light incident on the display screen 23 and the traveling direction of the light of image emitted from the display screen 23 increases. Therefore, it is possible to suppress the phenomenon that the external light overlaps a part of the virtual image VRI.

This phenomenon is suppressed by arranging the deflection prism array 36 on the optical path between the light source unit 32 and the image display panel 21. Since the deflection prism array 36 deflects the illumination light from the light source unit 32 while transmitting it, the angle θ2 can be increased without tilting the image display panel 21 too much. Therefore, it is possible to suppress deterioration in the transmission efficiency of the illumination light in the image display panel 21 and suppress the occurrence of an extremely large dead space in the backlight 31.

Further, since the deflection prism array 36 is formed by arranging the deflection prism elements 36a, the physique of the backlight 31 is restricted from increasing. Thus, it is possible to provide the HUD 10 suitable for vehicle use.

Further, according to the first embodiment, the substrate portion 38 has the emission side optical surface 38a facing the image display panel 21 and formed in a planar shape common among the deflection prism elements 36a. Even when the deflection prism array 36 and the image display panel 21 rub against each other due to the influence of vibration or the like applied to the vehicle 1, the flat emission side optical surface 38a hits the image display panel 21, so that the deflection prism array 36 can be restricted from being damaged. Therefore, it is possible to provide the HUD 10 suitable for vehicle use.

Further, according to the first embodiment, the image display panel 21 is arranged in such a posture that the direction DNs of the unit normal vector Ns of the display screen 23 is along the direction DS1 of the before-transmission vector S1. Therefore, the generation of dead space due to the tilting of the image display panel 21 is suppressed, compared with a backlight in which the illumination light is not deflected by the deflection prism array 26.

SECOND EMBODIMENT

Figure 6:
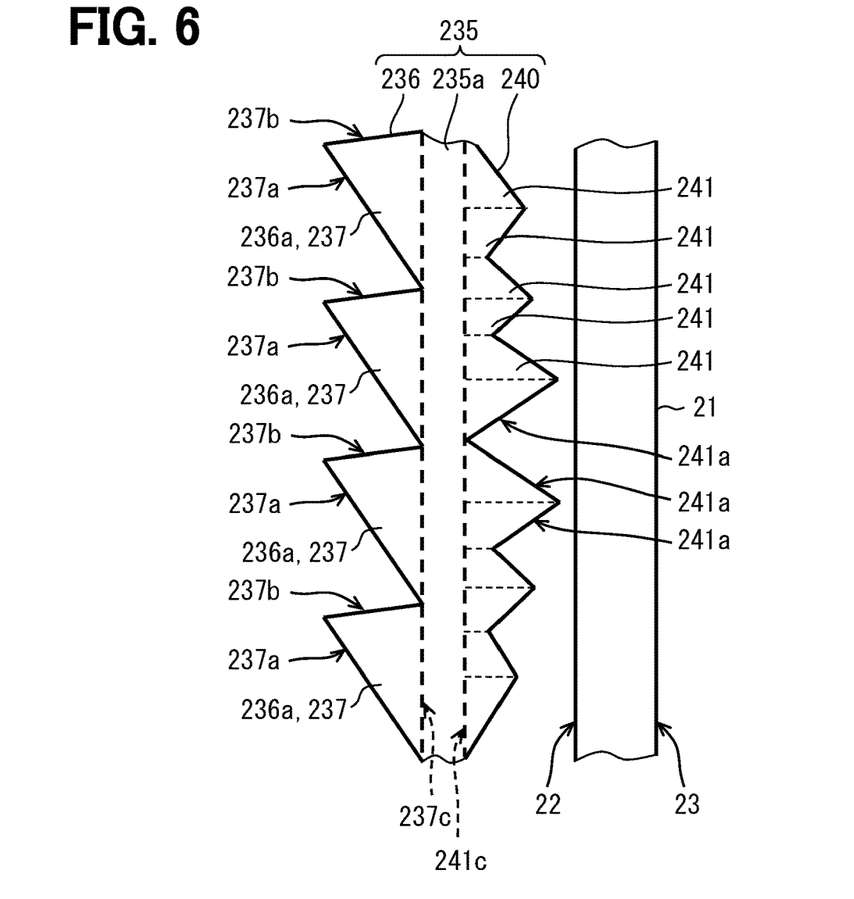
FIG. 6 is a cross-sectional view illustrating a prism array member according to a second embodiment.

As shown in FIG. 6, the second embodiment is a modification of the first embodiment. The second embodiment will be described focusing on matters different from the first embodiment.

The deflection prism array 236 of the second embodiment forms a prism array member 235 integrally with the optical mixing prism array 240. The prism array member 235 is translucent as being made of an optical material such as synthetic resin or glass. The prism array member 235 has a flat plate-shaped substrate portion 235a, and the deflection prism array 236 is arranged between the light source unit 32 and the substrate portion 235a. The optical mixing prism array 240 is arranged between the image display panel 21 and the substrate portion 235a. The substrate portion 235a is arranged so as to be substantially parallel to the light source arrangement surface 34a, the display screen 23, and the illumination target surface 22.

The deflection prism array 236 has prism portions 237 joined to the substrate portion 235a and corresponding to the deflection prism elements 236a respectively. That is, each deflection prism element 236a is formed so that the incident side optical surface 237a forms a predetermined angle with respect to the joint surface 237c joined to the substrate portion 235a. Each deflection prism element 236a formed by the prism portion 237 and the substrate portion 235a are formed to have the same refractive index η. Therefore, each deflection prism element 236a of the second embodiment deflects the illumination light using the incident side optical surface 237a. The illumination light is reflected by not both the incident side optical surface 37a and the emission side optical surface 38a as in the first embodiment.

The incident side optical surface 237a is inclined with respect to the light source arrangement surface 34a, the display screen 23, the illumination target surface 22, and the substrate portion 235a. The incident side optical surfaces 237a are provided in the same number as the deflection prism elements 236a so as to correspond to the deflection prism elements 236a respectively. The incident side optical surface 237a is formed in an elongated planar shape extending along the longitudinal direction LD. The incident side optical surfaces 237a face in a common direction. The step connecting surface 237b similar to that of the first embodiment is formed between the incident side optical surfaces 237a of the deflection prism elements 236a adjacent to each other.

Each deflection prism element 236a is shaped asymmetry in the lateral direction SD. Specifically, the incident side optical surface 237a and the substrate portion 235a are separated from each other as moving to the separation side in the lateral direction SD. In this way, the deflection prism array 236 that refracts the illumination light on the incident side optical surface 237a is configured such that the angle θ2 formed between the after-transmission vector S2 and the unit normal vector Ns is larger than the angle θ1 formed between the before-transmission vector S1 and the unit normal vector Ns of the display screen 23. In the second embodiment, the after-transmission vector S2 is calculated using the illumination light emitted from the joint surface 237c of each prism portion 237 to the substrate portion 235a in a unit time.

The optical mixing prism array 240 is different from the deflection prism array 236. The optical mixing prism array 240 is formed by arranging the optical mixing prism elements 240a along the lateral direction SD, while the optical mixing prism element 240a transmits and deflects the illumination light from the light source unit 32. The arrangement pitch of the optical mixing prism element 240a is set smaller than the arrangement pitch of the deflection prism element 236a. The extending direction of the optical mixing prism element 240a corresponds to the extending direction of the deflection prism element 236a, and the arrangement direction of the optical mixing prism elements 240a correspond to the arrangement direction of the deflection prism elements 236a.

The optical mixing prism array 240 has a prismatic portion 241 joined to the substrate portion 235a and corresponding to each optical mixing prism element 240a. The optical mixing prism array 240 is formed so that the emission side optical surface 241a forms an appropriate angle with respect to the joint surface 241c joined to the substrate portion 235a. Each optical mixing prism element 240a formed by the prismatic portion 241 and the substrate portion 235a are formed to have the same refractive index. Therefore, each optical mixing prism element 240a of the second embodiment deflects the illumination light by using the emission side optical surface 241a.

The emission side optical surface 241a is inclined with respect to the light source arrangement surface 34a, the display screen 23, the illumination target surface 22, and the substrate portion 235a. The emission side optical surfaces 241a are provided in the same number as the optical mixing prism elements 240a so as to correspond to the optical mixing prism elements 240a respectively. The emission side optical surface 241a is formed in an elongated flat shape extending along the longitudinal direction LD.

The emission side optical surfaces 241a adjacent to each other have the inclination angles different from each other with respect to the joint surface 241c. More specifically, one of the adjacent emission side optical surfaces 241a is separated from the joint surface 241c as extending toward one side in the lateral direction SD, while the other is separated from the joint surface 241c as extending toward the other side in the lateral direction SD. That is, the emission side optical surfaces 241a adjacent to each other have gradients in the opposite direction.

In this way, the optical mixing prism array 240 mixes the illumination lights transmitted through the different optical mixing prism elements 240a, since the optical mixing prism elements 240a locally deflect the illumination light in different directions.

The emission side optical surface 241a of each optical mixing prism element 240a has inversion symmetry with respect to the axis of symmetry of the optical mixing prism array 240 in the lateral direction SD. Therefore, in the entire optical mixing prism array 240, the direction of the vector sum of the Poynting vectors of the illumination light is maintained between before and after the transmission of the optical mixing prism array 240 (between immediately before the transmission and immediately after the transmission).

In the second embodiment, a color separation action may be generated by forming the deflection prism element 236a in the shape of a triangular prism. However, the optical mixing prism array 240 maintains the direction of the vector sum of the Poynting vectors of the illumination light before and after the transmission of the optical mixing prism array 240. While maintaining this direction, each optical mixing prism element 240a locally deflects the illumination light in different directions to mix the illumination lights transmitted through the different optical mixing prism elements 240a. Therefore, the color separation action can be neutralized by the mixing of the illumination light. Thus, the image in bright color can be displayed on the display screen 23.

According to the second embodiment, the deflection prism array 236 and the optical mixing prism array 240 are integrally formed to form the prism array member 235. Thus, it is possible to mix the illumination lights at position close to the position where the color dispersion is generated in the deflection prism array 236. Therefore, since the color separation action can be effectively neutralized, the color of the image displayed on the display screen 23 can be further brightly improved.

Further, according to the second embodiment, the arrangement pitch of the optical mixing prism element 240a is smaller than the arrangement pitch of the deflection prism element 236a. According to the magnitude relationship of the arrangement pitch, when a part of the illumination light transmitted through the deflection prism element 236a is transmitted to a certain optical mixing prism element 240a, the other part can be transmitted to another optical mixing prism element 240a. Therefore, the mixing action can be effectively exerted on the illumination lights dispersed in color from the same deflection prism element 236a.

Therefore, since the color separation action can be effectively neutralized, the color of the image displayed on the display screen 23 can be further brightly improved.

THIRD EMBODIMENT

Figure 7:
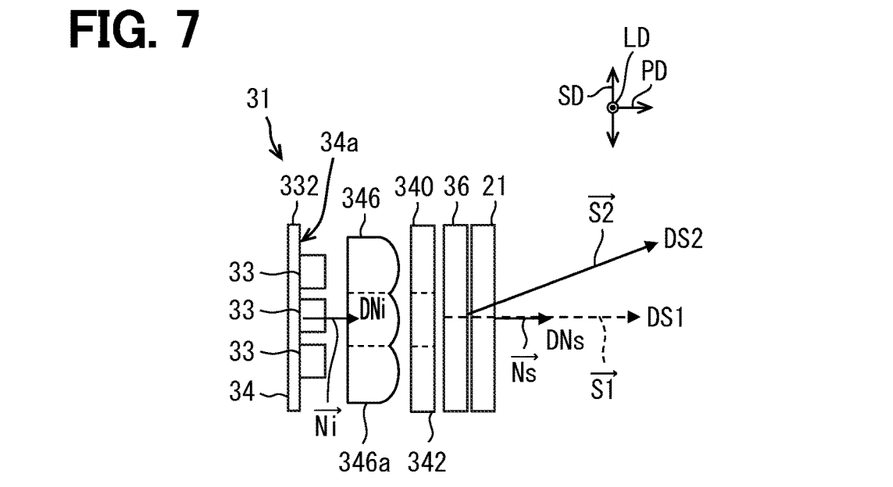
FIG. 7 is a diagram illustrating an internal configuration of a display device according to a third embodiment.
Figure 8:
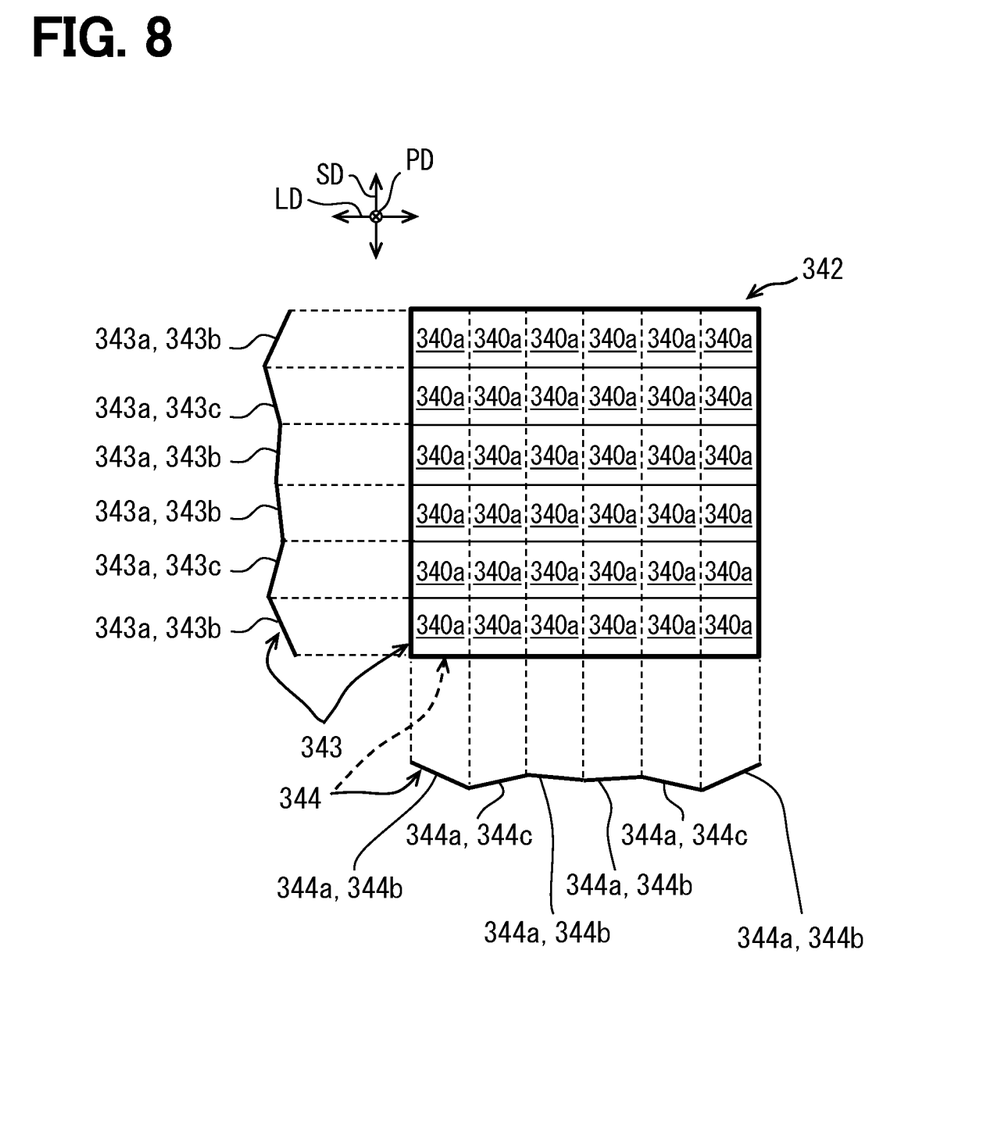
FIG. 8 is a plan view illustrating one division block in an optical mixing prism array of the third embodiment.
Figure 9:
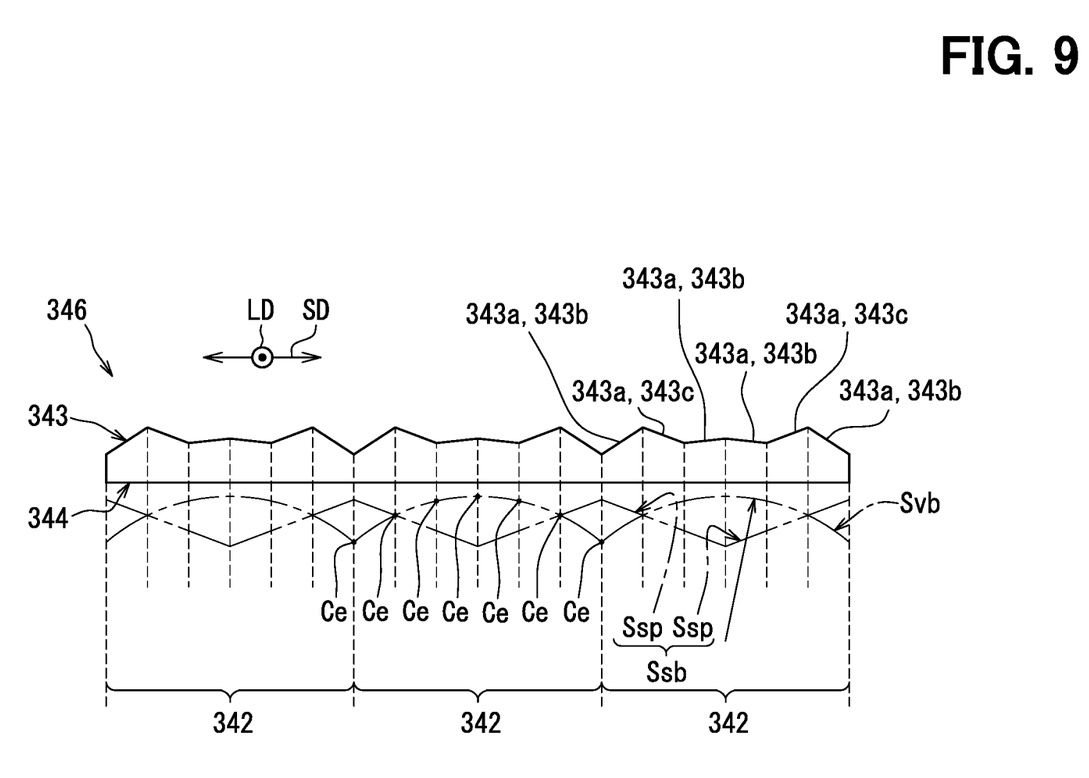
FIG. 9 is a cross-sectional view including a lateral direction of the optical mixing prism array of the third embodiment.

As shown in FIGS. 7 to 9, a third embodiment is a modification to the first embodiment. The third embodiment will be described focusing on configurations different from the first embodiment.

In the light source unit 332 of the third embodiment, the light source elements 33 are arranged on the light source arrangement surface 34a in the two-dimensional direction along the longitudinal direction LD and the lateral direction SD. A condensing lens 346 and an optical mixing prism array 340 are added on the optical path between the light source unit 332 and the deflection prism array 36.

The condensing lens 346 is arranged in the optical path between the light source unit 332 and the optical mixing prism array 340. The condensing lens 346 is a lens array composed of condensing lens elements 346a arranged according to the number and arrangement of the light source elements 33.

Each condensing lens element 346a is formed to be translucent by using, for example, an optical material made of synthetic resin or glass. Each condensing lens element 346a is arranged so as to face the corresponding light source element 33. Each condensing lens element 346a parallelizes the illumination light emitted from the corresponding light source element 33 by condensing. Specifically, the illumination light from the light source element 33 is brought closer to the parallel luminous flux after passing through the condensing lens element 346a, compared with a state before the transmission, but is not limited to a completely parallel luminous flux.

The optical mixing prism array 340 is arranged on the optical path between the condensing lens 346 and the deflection prism array 36, and is provided as a single member. The optical mixing prism array 340 is formed to be translucent by using an optical material such as synthetic resin or glass. The optical mixing prism array 340 is formed in a flat plate shape as a whole. The optical mixing prism array 340 is integrally formed by arranging plural division blocks 342 with each other. In the present embodiment, the plural division blocks 342 are arranged according to the number and arrangement of the light source elements 33 and the condensing lens elements 346a. In the present embodiment, the division blocks 342 have substantially the same shape.

Figure 10:
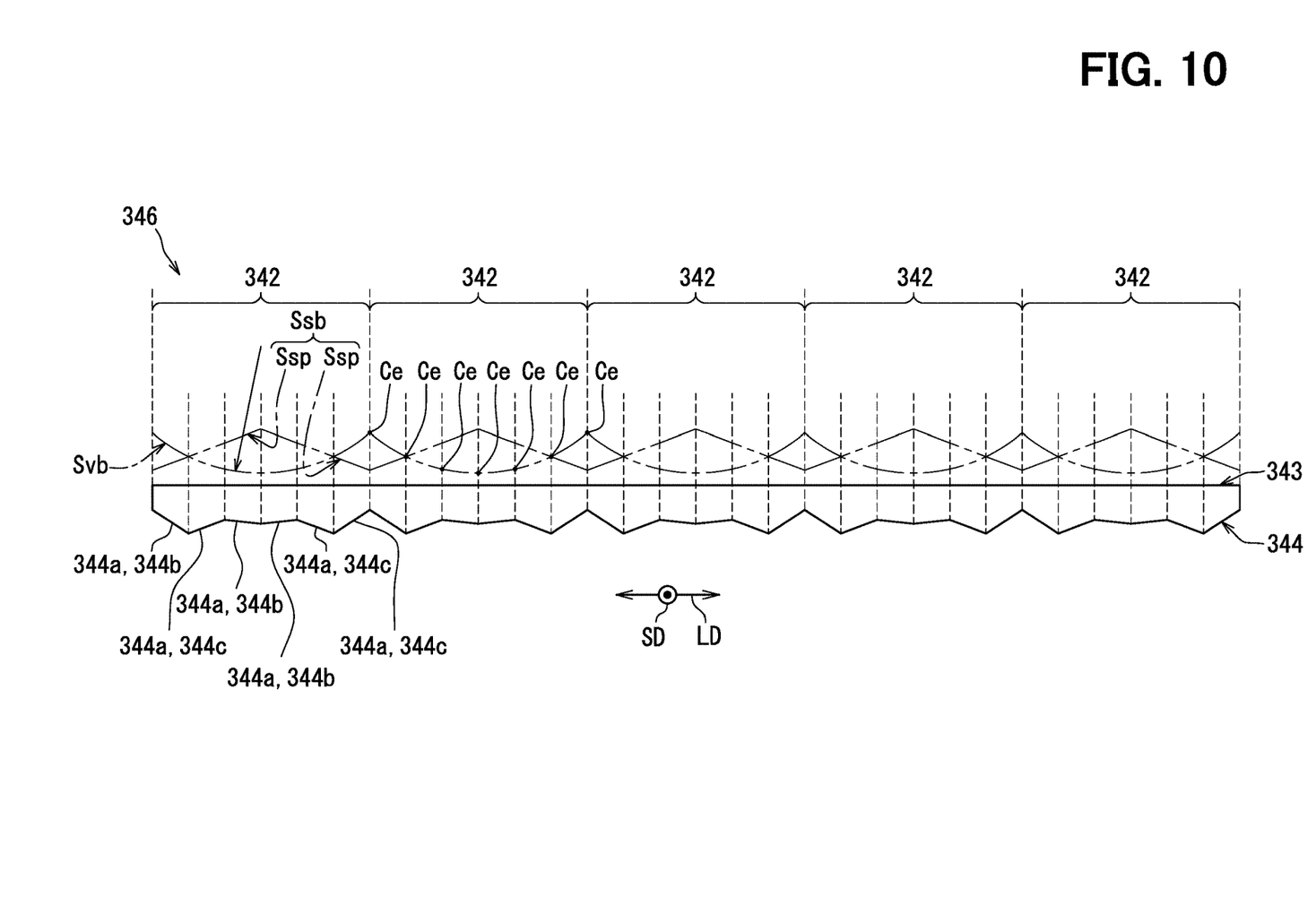
FIG. 10 is a cross-sectional view including a longitudinal direction of the optical mixing prism array of the third embodiment.

The incident side surface 343 of the optical mixing prism array 340 facing the condensing lens 346 has plural division deflection surfaces 343a divided in striped state. The division direction of the division deflection surfaces 343a on the incident side surface 343 is, for example, along the lateral direction SD. Each division deflection surface 343a extends linearly along the longitudinal direction LD. Therefore, in the cross section including the longitudinal direction LD, one division deflection surface 343a is formed so as to straddle the plural division blocks 342. In this way, each division deflection surface 343a is formed as one division region defined by dividing the incident side surface 343 with a predetermined division width.

On the other hand, the emission side surface 344 of the optical mixing prism array 340 facing the deflection prism array 36 has plural division deflection surfaces 344a divided in striped state. The division direction of the division deflection surfaces 344a on the emission side surface 344 is along the longitudinal direction LD. Each division deflection surface 344a extends along the lateral direction SD. Therefore, in the cross section including the lateral direction SD, one division deflection surface 344a is formed so as to straddle the plural division blocks 342. In this way, each division deflection surface 344a is formed as one division region defined by dividing the emission side surface 344 with a predetermined division width.

As shown in FIG. 8 illustrating the incident side surface 343 of one division block 342, the division deflection surface 343a has plural approximate planes 343b and plural anisotropic deflection planes 343c. Similarly, the division deflection surface 344a of the emission side surface 344 has plural approximate planes 344b and plural anisotropic deflection planes 344c.

The approximate plane 343b, 344b is formed based on a virtual convex curved surface Svb defined as a virtual optical surface in the optical mixing prism array 340. The virtual convex curved surface Svb has a smooth cylindrical surface shape by being curved in a convex shape that is convex to the outer side of the optical mixing prism array 340 along the division direction of the division deflection surface 343a, 344a. The approximate plane 343b, 344b is formed in a flat shape as an approximate plane obtained by linear interpolation of plural coordinates extracted from the virtual convex curved surface Svb. In the present embodiment, end coordinates Ce of the virtual convex curved surface Svb at the end of the divided region is adopted as the plural coordinates, and the gradient of the approximate plane 343b, 344b is specified by linear interpolation between the end coordinates Ce. The virtual convex curved surface Svb partially appears on the respective surface 343, 344 in a state of being flattened by approximation.

The anisotropic deflection plane 343c, 344c is interposed between the approximate planes 343b, 344b. The anisotropic deflection plane 343c, 344c is formed based on a virtual inclined surface Ssb defined as a virtual optical surface in the optical mixing prism array 340. The virtual inclined surface Ssb is composed of plural planar slopes Ssp whose gradient direction changes at a portion corresponding to the apex of the virtual convex curved surface Svb in the cross section including the division direction of the division deflection surface 343a, 344a. The gradient of each planar slope Ssp is set to be opposite to the corresponding gradient of the virtual convex curved surface Svb. The anisotropic deflection plane 343c, 344c partially appears on the respective surface 343, 344 by extracting a part of the virtual inclined surface Ssb. The division deflection surface 343a, 344a has inversion symmetry with respect to the axis of symmetry set at the center of the division block 342 in the division direction of the division deflection surface 343a, 344a.

In this way, the extending direction of the division deflection surfaces 343a and the extending direction of the division deflection surfaces 344a intersect in one division block 342. Therefore, the optical mixing prism elements 340a, each of which occupies a rectangular region, are arranged in the two-dimensional direction. The optical mixing prism array 340 mixes the illumination lights transmitted through the different optical mixing prism elements 340a, since each optical mixing prism element 340a locally deflects the illumination light in different directions.

Since the division deflection surface 343a, 344a has inversion symmetry in each division direction, the inversion symmetry in each of the longitudinal direction LD and the lateral direction SD is maintained in the entire one division block 342. Therefore, in the entire division block 342, the direction of the vector sum of the Poynting vectors of the illumination light is maintained before and after the transmission of the division block 342. Further, also in the entire optical mixing prism array 240, which is an aggregate of the division blocks 342, the direction of the vector sum of the Poynting vectors of the illumination light is maintained before and after the transmission of the optical mixing prism array 240 (between immediately before transmission and immediately after transmission). The before-transmission of the optical mixing prism array 340 in the present embodiment means a timing immediately before the transmission of the incident side surface 343, and the after-transmission of the optical mixing prism array 340 means a timing immediately after the transmission of the emission side surface 344.

In the backlight 31 of the third embodiment, one condensing lens element 346a and one division block 342 correspond to one light source element 33. An illumination unit composed of a set of the light source element 33, the condensing lens element 346a, and the division block 342 illuminates a corresponding area of the illumination target surface 22 of the image display panel 21. Therefore, it is possible to carry out local dimming control in which only the light source element 33 corresponding to the area by which the image is displayed on the display screen 23 is turned on and the other light source elements 33 are turned off.

According to the third embodiment, the illumination light emitted from one of the light source elements 33 and transmitted through the corresponding division block 342 illuminates the corresponding area of the image display panel 21. Thus, local dimming control can be effectively performed by controlling the light source elements 33.

Figure 11:
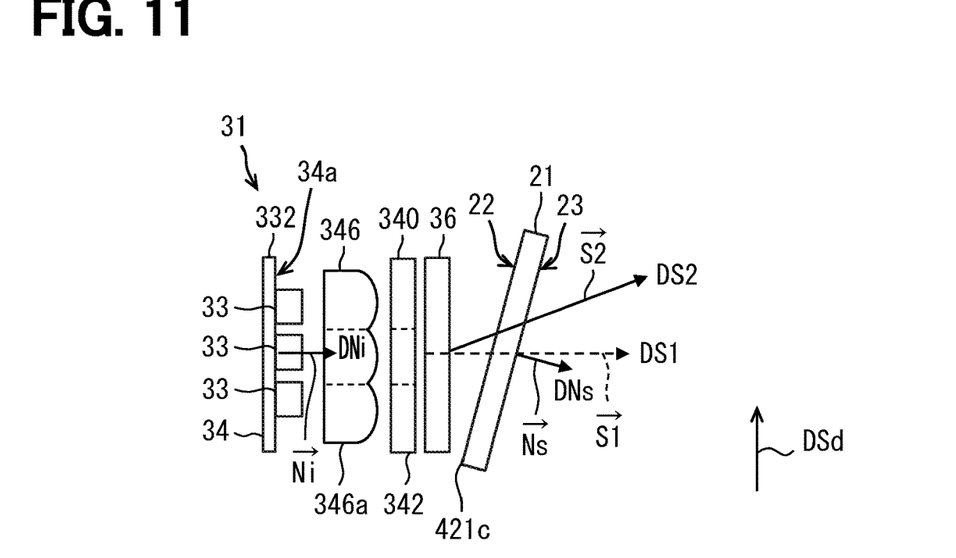
FIG. 11 is a diagram illustrating an internal configuration of a display device according to a fourth embodiment.

In the HUD 10 that displays a virtual image VRI that is superimposed on the scenery outside the vehicle, the display content may be displayed only in a limited area of the image display panel 21. In this case, if the local dimming control is performed, it is expected that the display visibility is improved by increasing the luminance contrast between the display area and the non-display area, and the power consumption can be saved by turning off a part of the light source elements 33. (cl FOURTH EMBODIMENT As shown in FIG. 11, a fourth embodiment is a modification to the third embodiment. The fourth embodiment will be described focusing on configurations different from the third embodiment.

The image display panel 21 of the fourth embodiment is inclined with respect to the light source arrangement surface 34a and the deflection prism array 36. The inclination direction of the image display panel 21 is set based on a deflection difference direction DSd. The deflection difference direction DSd is defined as a direction of a vector obtained by subtracting the before-transmission vector S1 from the after-transmission vector S2.

Specifically, the image display panel 21 is inclined so as to separate from the light source arrangement surface 34a as extending from the closest portion 421c of the image display panel 21 the closest to the light source arrangement surface 34a in the deflection difference direction DSd.

According to the fourth embodiment, the angle 82 can be further increased by the tilted arrangement of the image display panel 21. Thus, even if the display screen 23 is enlarged, external light can be suppressed from overlapping the virtual image VRI.

OTHER EMBODIMENT

Although multiple embodiments have been described above, the present disclosure is not construed as being limited to these embodiments, and can be applied to various embodiments and combinations within a scope that does not depart from the gist of the present disclosure.

As a modification 1 regarding the first, third, and fourth embodiments, the prism portion 37 may be arranged between the image display panel 21 and the substrate portion 38 in the deflection prism array 36. In this case, the shapes are interchanged between the incident side optical surface 37a and the emission side optical surface 38a. The step connecting surface 37b connects the emission side optical surfaces 38a adjacent to each other.

As a modification 2 of the second embodiment, the optical mixing prism array 240 is formed between the light source unit 32 and the substrate portion 235a, and the deflection prism array 236 is formed between the image display panel 21 and the substrate portion 235a.

Figure 12:
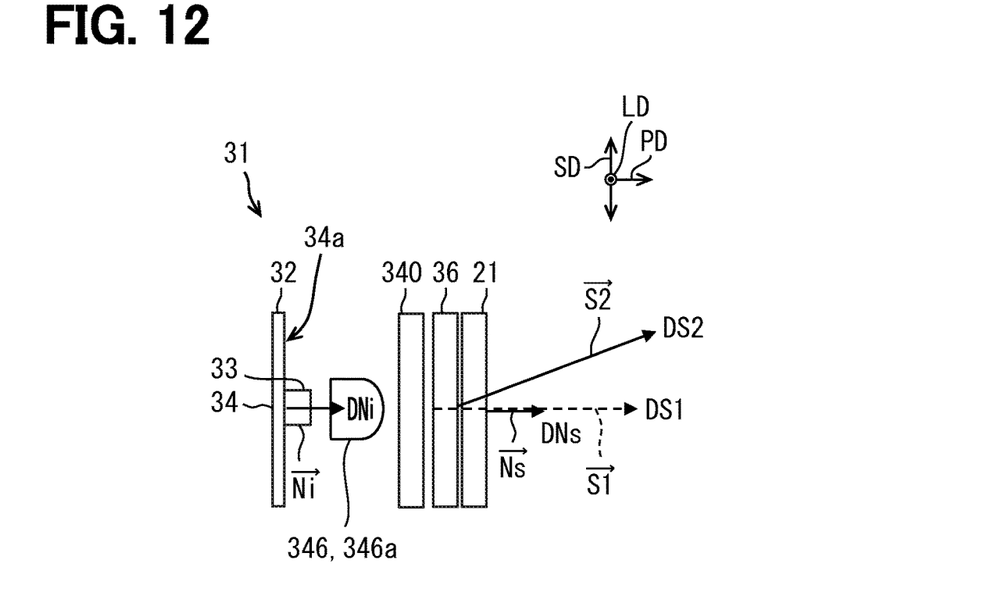
FIG. 12 is a diagram illustrating an internal configuration of a modified display device.

As a modification 3 of the third and fourth embodiments, as shown in FIG. 12, the condensing lens 346 and the optical mixing prism array 340 are added on the optical path between the light source unit 332 and the deflection prism array 36. The light source unit 332 may be configured as in the first embodiment. That is, the light source elements 33 may be arranged in the longitudinal direction LD.

As a modification 4, the surface of the deflection prism array 36 that refracts the illumination light, for example, the incident side optical surface 37a and the emission side optical surface 38a may be formed in a curved surface shape that is curved in a convex or concave shape.

As a modification 5, a light source that emits a single color of illumination light may be adopted as the light source element 33. A linear light source or a planar light source may be adopted as the light source element 33.

As a modification 6, optical elements such as a convex lens, a concave lens, a diffuser plate, a polarizing plate, and a retardation plate can be added to the backlight 31.

As a modification 7, the light guide unit 51 may have a plane mirror and a concave mirror, and may have only a concave mirror. Optical elements such as a convex lens, a concave lens, a diffuser plate, a polarizing plate, and a retardation plate may be added to the light guide unit 51. The display screen 23 may be arranged so as to face the projection unit 3a in the up-down direction without the light guide unit 51. The light of the image emitted from the display screen 23 may be projected onto the projection unit 3a without being reflected.

As a modification 8, an optical element such as a polarizing plate, a retardation plate, and a lens array may be attached to the display screen 23 for stereoscopic display.

What is claimed is:

1. A virtual image display device configured to display a virtual image for a vehicle comprising:
   a backlight that provides illumination light;
   an image display panel that transmits the illumination light and displays an image to be imaged as the virtual image on a display screen;
   a light guide unit having at least one reflective element to form an optical path that guides a light of image emitted from the image display panel; and
   a housing that houses the backlight, the image display panel and the light guide unit, the housing having an optical opening through which the light of image passes, wherein
   the backlight has
      a light source unit that emits the illumination light toward the image display panel, and
      a deflection prism array arranged on an optical path between the light source unit and the image display panel, the deflection prism array including deflection prism elements arranged to deflect the illumination light from the light source unit while transmitting the illumination light,
   the deflection prism array deflects a direction of an after-transmission vector corresponding to a Poynting vector of the illumination light immediately after passing through the deflection prism array with respect to a direction of a before-transmission vector corresponding to a Poynting vector of the illumination light immediately before passing through the deflection prism array,
   an angle formed between a unit normal vector of the display screen and the after-transmission vector is larger than an angle formed between the unit normal vector of the display screen and the before-transmission vector, and a direction of the unit normal vector of the display screen is different from an incident direction of an external light incident into the housing through the optical opening, by travelling oppositely from the light of image, and reaching the display screen from the light guide unit.

2. The virtual image display device according to claim 1, wherein the image display panel is arranged to have a posture in which a direction of the unit normal vector of the display screen is along the direction of the before-transmission vector.

3. The virtual image display device according to claim 1, wherein
the light source unit has a light source arrangement surface,
a direction of a vector difference obtained by subtracting the before-transmission vector from the after-transmission vector is defined as a deflection difference direction, and
the image display panel is inclined so as to separate from the light source arrangement surface as extending from a closest portion of the image display panel the closest to the light source arrangement surface in the deflection difference direction.

4. The virtual image display device according to claim 1, wherein each of the deflection prism elements is formed in a triangular prism shape, further comprising:
an optical mixing prism array different from the deflection prism array and arranged on the optical path between the light source unit and the image display panel, wherein
the optical mixing prism array includes optical mixing prism elements arranged to deflect the illumination light from the light source unit while transmitting the illumination light,
the optical mixing prism elements locally deflect illumination lights in directions different from each other, and
the optical mixing prism array mixes the illumination lights transmitting through the optical mixing prism elements different from each other while maintaining a direction of a vector sum of Poynting vectors of the illumination light between before and after passing through the optical mixing prism array.

5. The virtual image display device according to claim 4, wherein the deflection prism array and the optical mixing prism array are integrally formed with each other to form a prism array member.

6. The virtual image display device according to claim 1, wherein
the deflection prism array has a substrate portion common among the deflection prism elements, and a prism portion joined to the substrate portion correspondingly to each of the deflection prism elements,
the substrate portion has an emission side optical surface facing the image display panel, and
the emission side optical surface is formed in a plane common among the deflection prism elements.

7. A virtual image display device configured to display a virtual image for a vehicle comprising:
a backlight that provides illumination light; and
an image display panel that transmits the illumination light and displays an image to be imaged as the virtual image on a display screen, wherein
the backlight has
a light source unit that emits the illumination light toward the image display panel, and
a deflection prism array arranged on an optical path between the light source unit and the image display panel, the deflection prism array including deflection prism elements arranged to deflect the illumination light from the light source unit while transmitting the illumination light,
the deflection prism array deflects a direction of an after-transmission vector corresponding to a Poynting vector of the illumination light immediately after passing through the deflection prism array with respect to a direction of a before-transmission vector corresponding to a Poynting vector of the illumination light immediately before passing through the deflection prism array,
an angle formed between a unit normal vector of the display screen and the after-transmission vector is larger than an angle formed between the unit normal vector of the display screen and the before-transmission vector,
the light source unit has a light source arrangement surface,
a direction of a vector difference obtained by subtracting the before-transmission vector from the after-transmission vector is defined as a deflection difference direction, and
the image display panel is inclined so as to separate from the light source arrangement surface as extending from a closest portion of the image display panel the closest to the light source arrangement surface in the deflection difference direction.

8. A virtual image display device configured to display a virtual image for a vehicle comprising:
a backlight that provides illumination light; and
an image display panel that transmits the illumination light and displays an image to be imaged as the virtual image on a display screen, wherein
the backlight has
a light source unit that emits the illumination light toward the image display panel, and
a deflection prism array arranged on an optical path between the light source unit and the image display panel, the deflection prism array including deflection prism elements arranged to deflect the illumination light from the light source unit while transmitting the illumination light,
the deflection prism array deflects a direction of an after-transmission vector corresponding to a Poynting vector of the illumination light immediately after passing through the deflection prism array with respect to a direction of a before-transmission vector corresponding to a Poynting vector of the illumination light immediately before passing through the deflection prism array,
an angle formed between a unit normal vector of the display screen and the after-transmission vector is larger than an angle formed between the unit normal vector of the display screen and the before-transmission vector,
each of the deflection prism elements is formed in a triangular prism shape,
the virtual image display device further comprising: an optical mixing prism array different from the deflection prism array and arranged on the optical path between the light source unit and the image display panel, wherein
the optical mixing prism array includes optical mixing prism elements arranged to deflect the illumination light from the light source unit while transmitting the illumination light, the optical mixing prism elements locally deflect illumination lights in directions different from each other, the optical mixing prism array mixes the illumination lights transmitting through the optical mixing prism elements different from each other while maintaining a direction of a vector sum of Poynting vectors of the illumination light between before and after passing through the optical mixing prism array, and the deflection prism array and the optical mixing prism array are integrally formed with each other to form a prism array member.

9. The virtual image display device according to claim 8, wherein the image display panel is arranged to have a posture in which a direction of the unit normal vector of the display screen is along the direction of the before-transmission vector.

10. The virtual image display device according to claim 8, wherein an arrangement pitch of the optical mixing prism elements is smaller than an arrangement pitch of the deflection prism elements.

11. The virtual image display device according to claim 8, wherein the light source unit has a plurality of light source elements, the optical mixing prism array is divided into a plurality of division blocks respectively corresponding to the plurality of light source elements, and one of the plurality of light source elements emits light, and the illumination light transmitted through corresponding one of the division blocks illuminates a region of the image display panel corresponding to the division block.

\* \* \* \* \*